United States Patent [19]

Kennington et al.

[11] 4,023,440
[45] May 17, 1977

[54] MOTION TRANSMITTING DEVICES

[75] Inventors: Frank William Kennington, St. Brelade, Jersey, Guernsey (Channel Islands); Panayotis Constantine Dimitracopoulos, Lyford Cay - Nassau, Bahamas

[73] Assignee: Precision Mechanical Developments Ltd., St. Helier, Jersey, Guernsey (Channel Islands)

[22] Filed: Aug. 1, 1975

[21] Appl. No.: 599,370

[30] Foreign Application Priority Data

Aug. 2, 1974   United Kingdom ............. 34127/74

[52] U.S. Cl. .................................. 74/804; 74/805; 74/750 R; 74/86
[51] Int. Cl.² ........................................ F16H 7/06
[58] Field of Search ................ 74/750 R, 797, 801, 74/804, 805, 570, 86

[56] References Cited

UNITED STATES PATENTS

| | | | |
|---|---|---|---|
| 3,307,434 | 3/1967 | Kope | 74/804 |
| 3,472,097 | 10/1969 | Huska | 74/804 |
| 3,726,158 | 4/1973 | Brown | 74/804 |

FOREIGN PATENTS OR APPLICATIONS

| | | | |
|---|---|---|---|
| 1,339,301 | 4/1963 | France | 74/804 |
| 1,750,279 | 3/1971 | Germany | 74/804 |

*Primary Examiner*—Samuel Scott
*Assistant Examiner*—D. W. Keen

[57] ABSTRACT

A motion transmitting device comprising four basic elements, namely, eccentric means, meshing means in the form of a series of individually movable meshing elements, wheel means formed with portions complementary to the meshing elements, and movement-limiting means. The eccentric means is disposed to cause the meshing elements to sequentially wobble (or generally move) in-and-out of meshing engagement with the complementary portions, while the meshing elements are individually guided within specifc limits of wobbling motion (or, generally, motion) by the movement-limiting means.

In one embodiment, the wheel means is conveniently a toothed gear wheel, which meshes with a special form of transmission chain whose pins provide the meshing elements and which may conveniently extend to provide part of the movement-limiting means, the other part thereof comprising apertures in a datum member which define the limits of the movement of the pins.

Any two of the four basic elements can provide the input and the output of the device, and any desired ratio between input and output rotation speeds, in single or multiple-stage arrangements, can be obtained, by suitably choosing the numbers of meshing elements and complementary portions on the wheel means.

36 Claims, 19 Drawing Figures

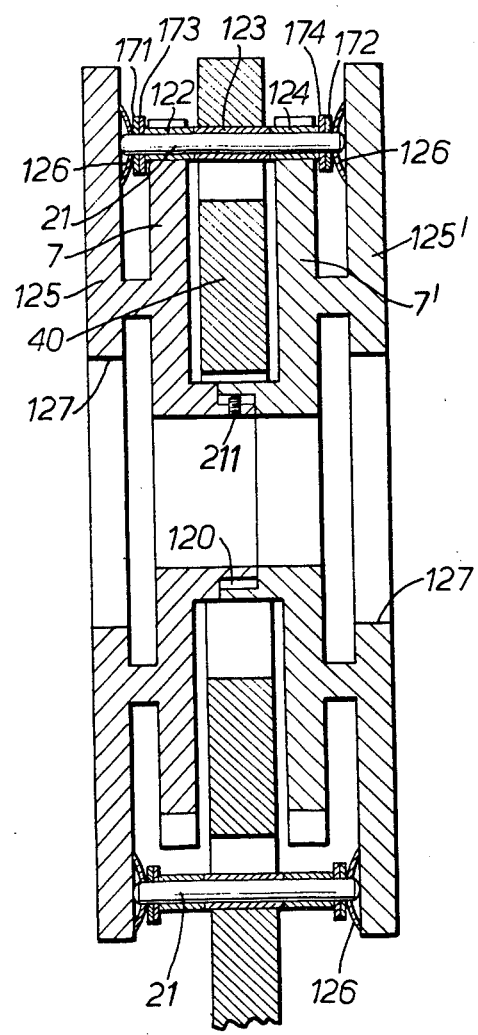
FIG. 17
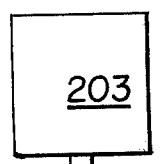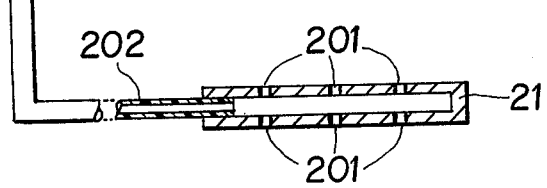
FIG. 18

MOTION TRANSMITTING DEVICES

PRIORITY

This application claims priority of British patent application No. 34127/74 dated Aug. 2, 1974.

FIELD OF INVENTION

This invention generally relates to gearing arrangements, speed-changing devices, torque converters, and like motion transmitting devices.

DESCRIPTION OF THE PRIOR ART

In conventional torque-transmission, engagement is usually provided between two elements of the transmission, along a particular area of contact. In conventional gearing, engagement is provided between a group only of adjoining teeth, usually only one tooth. Therefore, one, or at best, a few, teeth at a time must carry the entire load, the remaining teeth idly and wastefully rotating, until their turn arrives to carry the load. This is a terrible waste from engineering, manufacturing, economics, weight and size considerations.

At first glance it may appear that multitooth, or large area, engagement is routinely accomplished by the simple expedient of the interposition of coupling means such as chains, belts and the like. Indeed, by separating, normally engaging, gears and coupling them by means of chains, multitooth engagement is in fact accomplished. Likewise, belts and pulleys operate under substantially large area engagement. But such arrangements, although useful, have a serious drawback, namely, that because the load is transmitted along the stretched length of the chain (or belt), the chain (or belt) is only as strong as its weakest link (or portion). Furthermore, such conventional chain (or belt) applications, have several other problems, limitations and disadvantages, some of which are outlined elsewhere.

It is evident that, in conventional gearing, the larger the number of teeth, the fewer, proportionately, carry the load. But there is also a practical limit on the size of a gear (bulk, weight, manufacturing problems, tolerances, economic considerations). Accordingly, when a substantial speed reduction is required, several stages of the conventional pinion-and-gear arrangements are employed or worm and gear combinations are often preferred, in spite of their higher cost. Alternatively, various types of planetary gear mechanisms, suchf as epicyclic or hypocycloidal gear configurations are occasionally employed, the disadvantage being that again only one tooth per gear meshes, which is a most unsatisfactory arrangement, since substantially all the load is carried by one tooth at a time.

SUMMARY AND BASIC PRINICIPLES OF THE INVENTION

The present invention provides a unique and novel gearing and motion-transmitting concept and engineering principle, which may be generally stated as follows:

A motion transmitting device comprising eccentric means,
meshing means in the form of a series of individually movable meshing elements,
gear means formed with protions complementary to said meshing elements, and
movement-limiting means,
wherein said eccentric means is disposed to cause said meshing elements sequentially to wobble in and out of meshing engagement with said complementary portions, whilst said elements are individually guided within specific limits of wobbling motion by said movement-limiting means.

Because a toothed gear, having an infinite number of infinitely small teeth, becomes in the limit a "wheel" (such as a pulley), "gear means" will include "wheel means". Thus the invention may also be defined as follows:

A motion transmitting device comprising wheel means,
meshing means, and
movement limiting means,
wherein said meshing means is a series of individually movable elements each caused to wobble in and out of contact with successive circumferential portions of said wheel means, while they are guided within specific limits of wobbling motion by said movement limiting means.

However, the "wheel" is preferably a toothed wheel, for example a sprocket wheel, or a gear, although with toothless wheels the individually movable elements of the meshing means could be drivingly interconnected with the wheel means by frictional or electromagnetic means or any other suitable means.

The "meshing means", as above defined, is a series of separate "meshing elements", each such element capable of independent motion, and each element progressively engaging and disengaging (in wobbling motion) successive segments of the wheel (for example, tooth after tooth of a gear). It is convenient to interconnect these individual "meshing elements", but such interconnection must be substantially flexible, therefore such "meshing elements" may be conveniently arranged on (or be a part of) a "flexible loop", or, generally, a "flexible member", such as transmission chains, toothed belts, and transmission belts, especially those designed for use with the invention, and as described herein. However it is emphasized that, unlike what occurs in conventional torque-transmitting loops, i.e. conventional chains, belts, etc., the interconnecting parts of the flexible loops of the devices of this invention, carry substantially no forces, all forces being substantially carried, and shared in parallel by the engaging "meshing elements", while the reaction forces are likewise shared by an equivalent number of "movement limiting means".

The "movement limiting means" preferably comprises "engaging means" engaged by "capturing means", one of which may be arranged on the meshing means (or, generally, on the flexible member), while the other may be arranged on a "datum plate". The engaging means may be pins, while the capturing means may be apertures of predetermined shape. Preferably, bearing means will be journalled on the pins. When the flexible member is a transmission chain, the chain-pins may conveniently extend beyond the link plates, of the chain, each extending portion of such chain-pins forming the engaging means.

Preferably, the flexible member has more, or less, meshing means or meshing elements (i.e. pins, teeth, etc.) than the corresponding teeth or equivalent engaging means on the wheel (such as teeth on the gear means), which then makes the device a speed changing device.

Advantageously, in a motion transmitting device according to the invention one of three integers being the eccentric means, gear means and movement limiting means provides a rotational input, and another of these provides a rotational output. A two stage motion transmitting device is then easily achieved by combining two such devices so that the output of one device is drivingly interconnected with the input of the other device.

It is important to emphasize that the flexible members of the devices of this invention operate under unique conditions. For example, when a chain is used as the flexible member, a substantial number of its engaging pins (or rollers) carry the load. In fact such engaging pins (or rollers) share the load. The remaining pins, as well as all the link plates of the chain, carry no load, for all practical purposes. Also, since the entire flexible member always closely follows a circular path, the amount of flexing between adjoining segments is very small.

This load-sharing between engaging "meshing means", absence of load-carrying by the other parts of the "flexible member", very small flexing, multitooth engagement, and the several other advantages, combined with the relative compactness, light weight, relaxed manufacturing tolerances and other features of parts, components, assemblies and mechanisms, of devices built according to the present invention, make possible the design and manufacturing of gearing devices, speed-changing devices, torque converting devices, and the like, having many advantages over the prior art.

BRIEF DESCRIPTION OF THE DRAWINGS

The invention may be performed in various ways, and preferred embodiments thereof will now be described, by way of example, with reference to the accompanying drawings, in which:

FIG. 17 is a partly cross-sectional view of a device according to the invention showing a particular form of chain construction which may be used therein.

FIG. 18 is a partly cross-sectional view of a lubricating arrangement supplying lubricant to a meshing pin according to the invention, the pin being shown enlarged.

DESCRIPTION OF A SIMPLE EMBODIMENT

Figure 1:
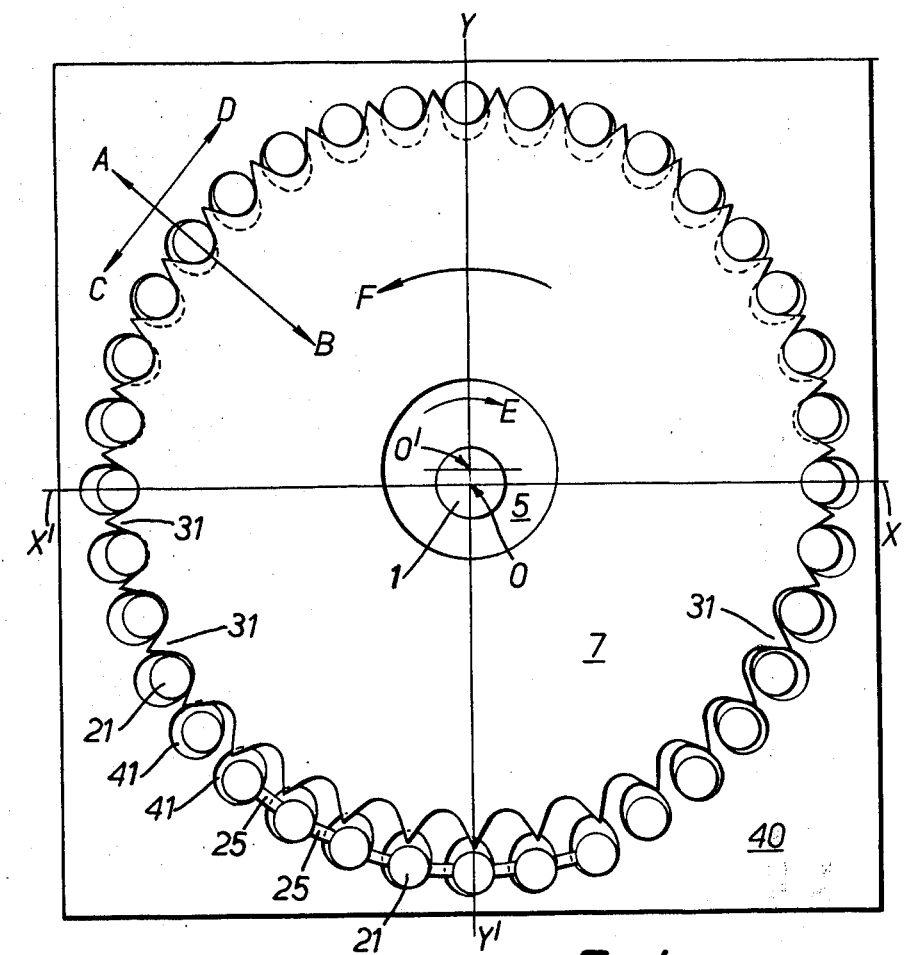
FIG. 1 is a front elevation of a simple embodiment according to the invention, in which only a few interconnecting members 25 are shown, while the others are not shown for clarity.

As previously stated, it would be very desirable to have multitooth engagement in gearing arrangements.

The present invention makes possible such multitooth engagement according to the basic concept and engineering principle of the invention.

However, since in gearing arrangements, motion is usually transmitted between two meshing gears, the principle of the invention, in its simplest form, may also be expressed as follows:

In a gearing arrangement including two meshing gears, one of the two gears is replaced by two sets of means, namely:

one set of meshing means, and one set of movement-limiting means.

The explanation of the above will be made by reference to FIG. 1, which is a somewhat diagrammatic illustration of a simple embodiment of the invention, with some parts removed in order to facilitate the ensuing description.

Input shaft 1 is arranged to rotate about its central longitudinal axis 0. Fixedly and eccentrically secured on input shaft 1 is eccentric 5, which is a cylindrical shaft having a central axis 0', the eccentricity being the distance 0—0'.

Gear 7 (which may be a sprocket wheel) is journalled for free rotation about eccentric 5. Therefore, as input shaft 1 rotates about its axis 0, the sprocket 7 will either eccentrically rotate (gyrate) or oscillate with respect to this axis 0, depending on whether it is free to move round as input shaft 1 rotates, or is restrained from moving round.

It would be normally expected that gear 7 meshes with another gear but, as previously explained, the conventional meshing second gear is replaced with two sets of means, namely the meshing means and the movement-limiting means.

In the device of FIG. 1, the meshing means are shown as being a series of "meshing elements", such as pins 21, conveniently interconnected by flexible member 25, thus forming an endless "flexible transmission member" or a "flexible transmission loop".

For clarity only a few pins 21 are shown as being interconnected by member 25, while, in fact, all pins are so interconnected, their axes being held apart at distances substantially equal to the pitch of gear 7.

It will be noted that there is at least one more pin 21 than there are gear-teeth 31, so that while pins and teeth mesh above the diametric line X-X', they progressively get out-of-mesh below it.

Figure 4:
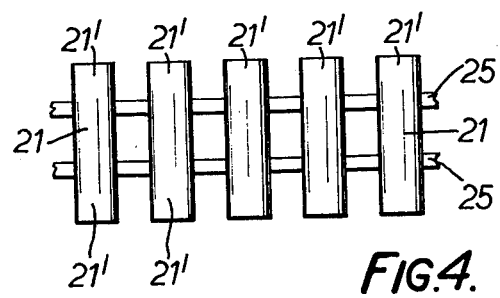
FIG. 4 is a front elevation of a portion of a teeth-meshing endless flexible loop member of the device of FIG. 3.
Figure 5:
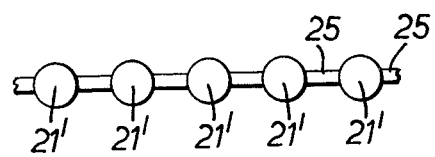
FIG. 5 is a side elevation of the portion of the loop illustrated in FIG. 4.

The arrangement of pins and interconnecting members 25 is better shown in FIGS. 4 and 5. In these figures, the interconnecting members 25 have taken the form of endless belts. Thus, pins 21 may be held apart by any convenient means, for example by one but preferably two endless flexible belts (i.e. loops) 25. The distance between these two belts 25 is such that the gear teeth of gear 7 may conventiently engage and mesh with the pins 21 but, in addition, it will be noted that the pins 21 extend or protrude beyond the belts 25 and such protruding ends 21' may be conveniently contained (for limited motion) within holes 41 formed in a stationary datum plate 40.

As it will now be explained, these protruding ends 21' and the holes 41, constitute the movement-limiting means of the invention.

The stationary datum plate 40 is adjacent to, and parallel to, the plane of the gear 7 and is formed with a series of holes, such as the abovementioned holes 41, the number of holes being equal to the number of pin ends 21', all these holes being arranged equidistantly about the axis of rotation of the shaft 1. Furthermore, as abovestated, each pin is long enough to enter one such hole, and the size and geometric configuration of each hole 41 is properly designed to restrain one protruding end 21' of pin 21 within the required two directional limits. For example, referring to one such hole 41, it allows pin 21 to move in the tangential direction CD as well as in the radial direction BA.

The reason for such motion of individual pins 21, contained within the limits imposed by holes 41, is the following: as the gear 7 gyrates, portions thereof move further away from the axis of the shaft 1; it is therefore necessary to allow each and every pin 21 a linear motion in the radial sense BA. Accordingly, the holes 41 in the datum plate provide the means for containing and restraining the motion of each and every pin 21 in the radial direction, thus ensuring the meshing of each and every pin with the teeth of gear 7 when required. Furthermore, because there are at least one more pins than teeth on gear 7 and in order to allow the progressive meshing of all pins with all teeth, some wobbling motion of individual pins must also be allowed and, accordingly, each and every pin 21 is also allowed a tangential motion in the direction CD. Thus the pins may be said to "wobble" in and out of engagement with the teeth on a complete cycle. The combination of such radial and tangential motions during an entire cycle, plus the actual diameter of the protruding end 21' of such pin 21, determines the proper size and shape of the capturing holes 41.

Figure 2:
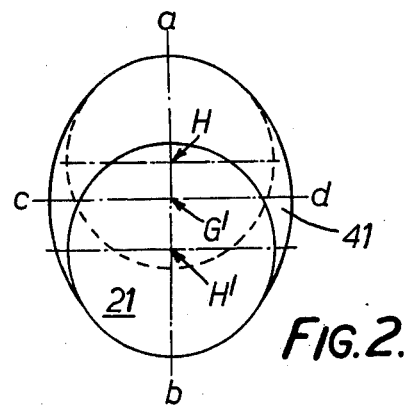
FIG. 2 is also a front elevation of an enlarged view of one "capturing means" 41 and one "engaging means" 21', according to the invention.

Specifically, referring to FIG. 2, the larger dimension a-b of holes 41 is substantially equal to the diameter of a protruding end 21' of the pin 21, plus the eccentricity 0-0', such larger dimension a-b being along the radial sense A-B of FIG. 1.

Although one plate 40 may suffice, two will be preferable, in which case, a hole in each such plate will restrain one of the two protruding ends 21' of each pin 21. When two plates are employed, they will have holes 41 facing one another and the gear 7 will conveniently rotate between these two plates 40.

To sum it up, the operation of the above device is as follows: As shaft 1 rotates, the eccentric 5 will force gear 7 to gyrate in the same direction and to rotate in the opposite direction, the rotation being at a greatly reduced speed. While the gear 7 is thus rotating and gyrating each pin (on the endless belts 25) will gyrate, its protruding end 21' wobbling within its restraining hole 41 on plate 40, the all-important fact being that several pins will always be in mesh.

In the example of FIG. 1, there are 35 gearteeth and 36 pins and, therefore, for every revolution of input shaft 1, say in the direction of arrow E, the gear 7 will rotate by 1/35th of a revolution, in the direction of arrow F.

Thus, in the above example, the principle of the invention was reduced to practice by replacing one of the conventional meshing gears with a set of meshing means and a set of movement-limiting means. More specifically, in the above embodiment, the meshing means took the form of a series of pins 21, conveniently interlinked and thereby constituting a special form of flexible transmission loop (for example, a specail form of transmission chain). The movement-limiting means took the form of protruding ends 21' of pins 21, which were captured, for limited wobbling motion, by holes 41 conveniently arranged on datum plates, such as datum plate 40.

In general, the movement-limiting means will include "engaging means" and "capturing means", and in the above embodiment it was the protruding ends 21' that became the engaging means, while the holes 41 were the capturing means.

Figure 6:
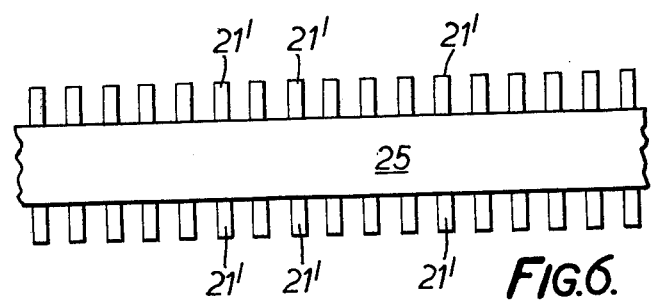
FIG. 6 is a front elevation of a portion of another embodiment of a loop of the invention.
Figure 7:
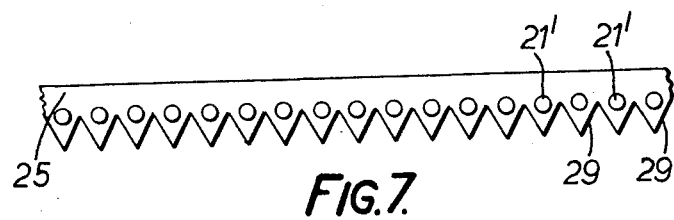
FIG. 7 is a side elevation of the portion of the loop illustrated in FIG. 6.

The meshing means need not be pins arranged on a flexible loop (as in the above example) but may take any convenient or desired form and shape depending on design and economic considerations. For example, the meshing means and their supporting flexible loops may take the form of a flexible toothed belt, similar to the well known timing belts, a length of which is illustrated in FIGS. 6 and 7. Such belt may be conveniently provided with a series of pin-like protrusions 21', which may be integrally formed with such belt or may be of different metallic or non-metallic material.

Figure 9:
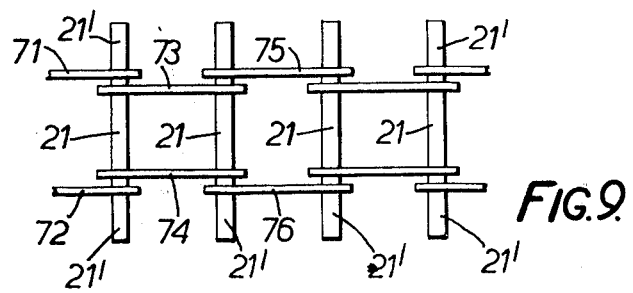
FIG. 9 is a front elevation of a section of a special rollerless chain being still another embodiment of a loop of the invention.

Likewise, the meshing means and their supporting flexible loops may very conveniently take the form of roller, or rollerless, chains of special construction and attributes, according to the invention, for example such as the special transmission chains illustrated in FIGS. 9 and 10 to be described in some detail below.

DETAILED ANALYSIS

Figure 3:
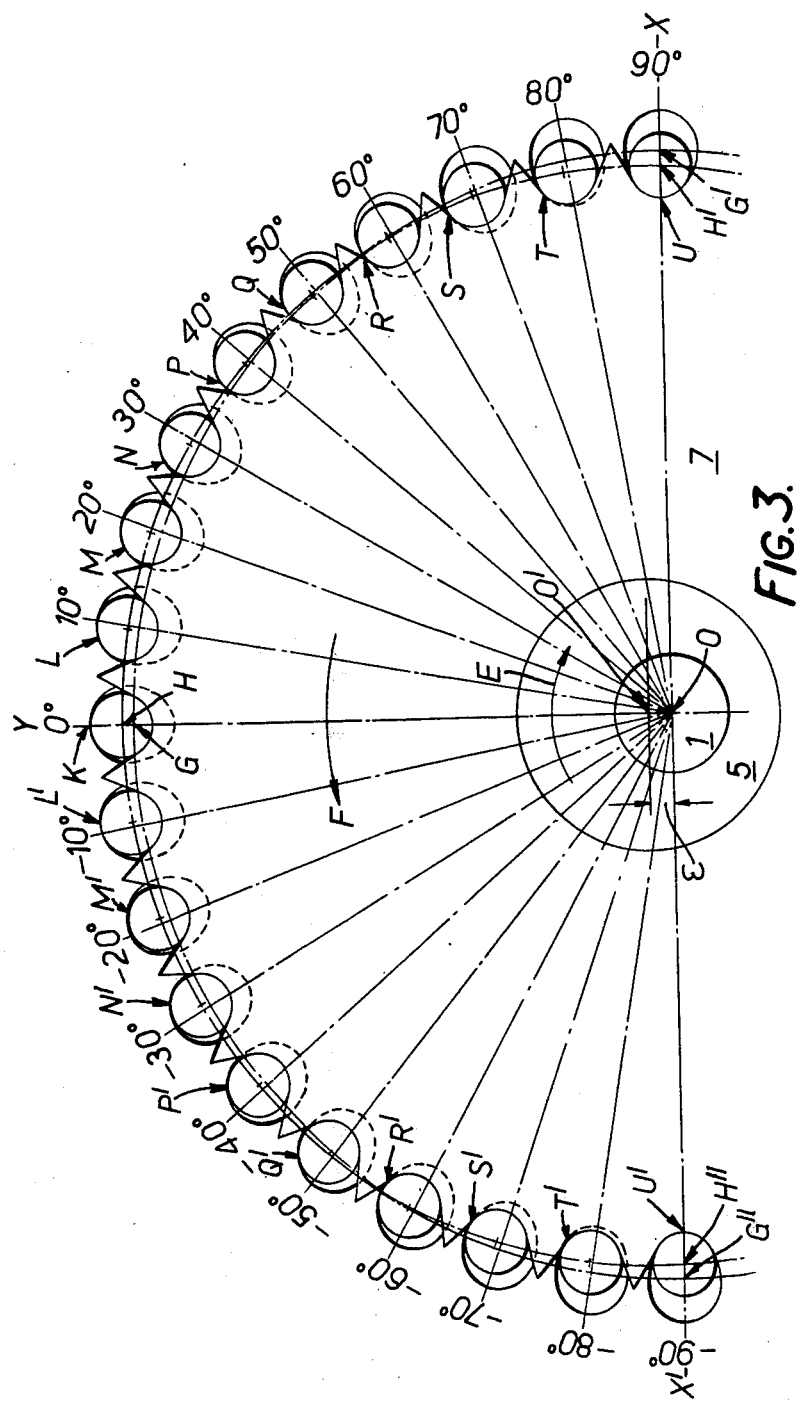
FIG. 3 is a diagram illustrating a pinengaging cycle (from −90° to 0° and from 0° to 90°), at 10° intervals, showing the relative positions of the principal components of the invention, in particular the gear means, the meshing means, and the movement-limiting means.

Referring to FIGS. 1 and 3, a more detailed analysis will now be made.

FIG. 3 is an enlarged diagram illustrating the pin-engaging cycle at 10° intervals over 180°, (from −90° to +90°). It illustrates in some detail the relative positions of the gear means (gear teeth), the meshing means (pins of a flexible loop), and the movement-limiting means (engaging pins and capturing holes).

As abovestated, the axes of pins (meshing means) 21 are held apart at distances substantially equal to the pitch of gear 7 and, therefore, if the maximum eccentric movement is along axis OY, all teeth of gear 7 will mesh with pins 21 above the axis X-X', while they will progressively get out of mesh below it. As also abovestated, assuming that shaft 1 rotates in the direction of arrow E, gear 7 will eccentrically rotate in the opposite direction, i.e. that of arrow F, at a reduced speed.

Thus, all centres of pins 21 will lie on the gear 7 pitch circle H''-H-H', i.e. a circle having radius O'H equal to the gear (or sprocket) Pitch Radius.

The capturing holes 41 will be equidistantly arranged about the centre of rotation 0 (of the input shaft 1), i.e. their design centres (the cross-section of lines a-b and c-d, see FIG. 2) will all lie on circle G''-G-G' (which will be defined as the pitch line) having a radius OG, which radius OG will be defined as Pitch Radius-Plate.

The equations will be:

$$HG + GO = HO' + 0'0$$

or $$P + R_p = R_s + \epsilon$$

or $$P = R_s - R_p + \epsilon$$

Where:
P = Pitch Line Distance (HG)
$R_p$ = Pitch Radius - Plate
$R_s$ = Pitch Radius - Sprocket
$\epsilon$ = Eccentricity Since the number of holes 41 equals the number of pins 21, which are, at least, one more than the number of teeth 31, different pins 21 will contact their capturing holes 41 at different points of contact (at any given instant of time). Under the conditions illustrated in FIG. 3 (i.e. at that instant), these points of contact, for successive pins (shown at 10° intervals), and within the quadrant YOX, are designated by:

K L M N P Q R S T U and within the symmetrical quadrant YOX' by:

K L' M' N' P' Q' R' S' T' U'

If one joins all these points with an imaginary line, one will obtain a wave-front and, when the gear 7 rotates, pins 21 will progressively change their points of contact along the periphery of their capturing holes 41 and, therefore, this wave-front will continuously move in the direction of arrow F.

It is important to note that while pins and teeth mesh above axis X-X' (i.e. substantially over 180°), only pins, teeth and holes, within YOX, are load-bearing (i.e. substantially within no more than a quadrant).

This is so because, if motion is in the direction F, and at the instant considered in FIG. 3, load is transmitted only at points K, L, M, . . ., T, U, while in the symmetrical quadrant YOX' the points of contact L', M', . . . etc. are obviously (as can be easily seen in the illustration of FIG. 3) at points along the hole's periphery where no load can possibly be transmitted.

For the above reasons the gearing principle of the invention may be referred to as "quadrant-wave drive".

Thus, taking into consideration the various parameters and by judicial calculations, a shape of hole 41 may be arrived at which will induce LOAD BEARING ENGAGEMENT of substantially up to a full quadrant, and therefore load bearing of up to one quarter of the total number of meshing means and teeth.

The enlarged FIG. 2 corresponds to the situation existing at 90° of FIG. 3, i.e. a pin is shown as captured in hole 41, point H' corresponding to the axis of pin 21.

Line c-d is the above referred to Pitch Line, which intersects at G' the radial contreline a-b.

The corresponding position of a pin 21 at 0° of FIG. 3, will be as illustrated by dotted lines in FIG. 2, point H being the axis of pin 21.

DESCRIPTION OF THE EMBODIMENT OF FIG. 8

As abovestated, special and preferred embodiments of such meshing means are modified versions of transmission chains built in accordance with the present invention. Such special chains may be of the rollerless, or roller, type, in which case, the gears meshing therewith may conveniently become sprocket wheels.

Since rollerless and roller chains and sprocket wheels meshing therewith are manufacutred in all sizes and in enormous quantities, they can be easily and inexpensively obtained, and their utilisation as building components of the present invention becomes a very attractive and promising possibility.

Figure 8:
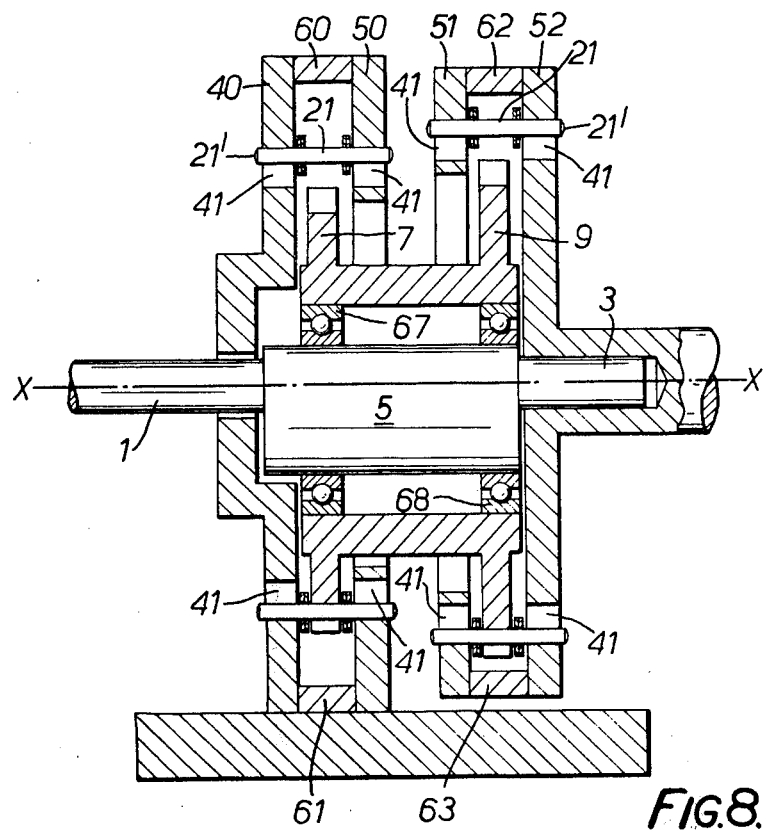
FIG. 8 is a cross-sectional view of a simple embodiment of a two-stage speed changing device according to the invention.

Thus, FIG. 8 illustrates, in a sectional view, a simple embodiment of the present invention utilising chain and sprocket wheel components (although the same arrangement may equally well employ different teeth meshing elements). Specifically FIG. 8 is a two stage speed changing arrangement constructed in accordance with the present invention.

In this embodiment, two stationary datum plates 40 and 50 are fixedly held apart by any covenient means, for example by means of spacers 60 and 61. Plates 40 and 50 are similar in all respects to datum plate 40 illustrated in FIG. 1. The chain empolyed in this arrangement may be rollerless (for example as illustrated in FIG. 9), or it may be a roller chain, (such as that illustrated in FIG. 10). Assuming that a rollerless chain is employed and referring for a moment to FIG. 9, all the pins 21 extend beyond the link plates (such as link plates 71, 73, 75, 72, 74, 76), so that the extending lengths 21' may conveniently protrude into pin capturing means such as the previously described holes 41 formed in plates 40 and 50.

A second set of plates 51 and 52 are also fixedly held apart by any convenient means, for example by spacers 62 and 63, and rotates as one unit with the output shaft 3, which is fixedly secured thereto, about the axis of rotation X — X. AS in the first stage, plates 51 and 52 of the second stage are formed with holes 41 restraining and guiding the movement of the ends 21' of the pins 21 of a second chain loop.

Both the input shaft 1 and the output shaft 3 are coaxially arranged, for independent rotation, about the common axis X — X. Eccentric 5 is fixedly secured about shaft 1, and journalled for rotation about eccentric 5 is the assembly of first stage gear 7 and second stage gear 9. Thus gears 7 and 9 are fixedly attached, or secured, to one another and may be bearingly supported on eccentric 5, for example by means of bearings 67 and 68, although any other type of bearing is equally well acceptable.

Essentially, each of the first and second stage assemblies is similar to that previously described in connection with FIG. 1, i.e. gear 7 eccentrically meshing with the first stage chain, and gear 9 also eccentrically meshing with the second stage chain, except that this second stage chain is contained for limited movement of each of its pins by the rotatable (about axis X—X) plates 51 and 52.

Let us assume that gear 7 has 40 teeth, first stage chain has 41 pins, second stage gear 9 has 41 teeth and second stage chain has 42 pins. Considering for a moment this second stage separately, for every revolution of gear 9, the output shaft 3 will turn 1/41 of a revolution. But since gears 7 and 9 are fixedly secured to one another, the output shaft 3 will rotate at a speed substantially equal to the difference between the rotational speeds of the individual two stages, and, in the above example, the speed reduction has been calculated to be 1 to 1680.

The direction of rotation of the output shaft will be the same, or the opposite, to that of the input shaft, depending on whether the second stage has less or more teeth than the first and therefore, in the above example, the output shaft will rotate in the opposite direction.

Whilst a two stage device is described in conjunction with FIG. 8, it is evident that a one stage device is equally well possible simply by omitting the other stage.

DESCRIPTION OF THE EMBODIMENT OF FIG. 11

In a gearing arrangement built in accordance with the priniciples of the present invention, any of the four previously enumerated components may be the input or the output. That is, such input or output may be any of:

the eccentric,
the (rigid) gear means,
the meshing means (for example the flexible loop),
The movement-limiting means.

In fact, the arrangement described in conjunction with FIG. 8 is only one embodiment of such alternatives.

Figure 11:
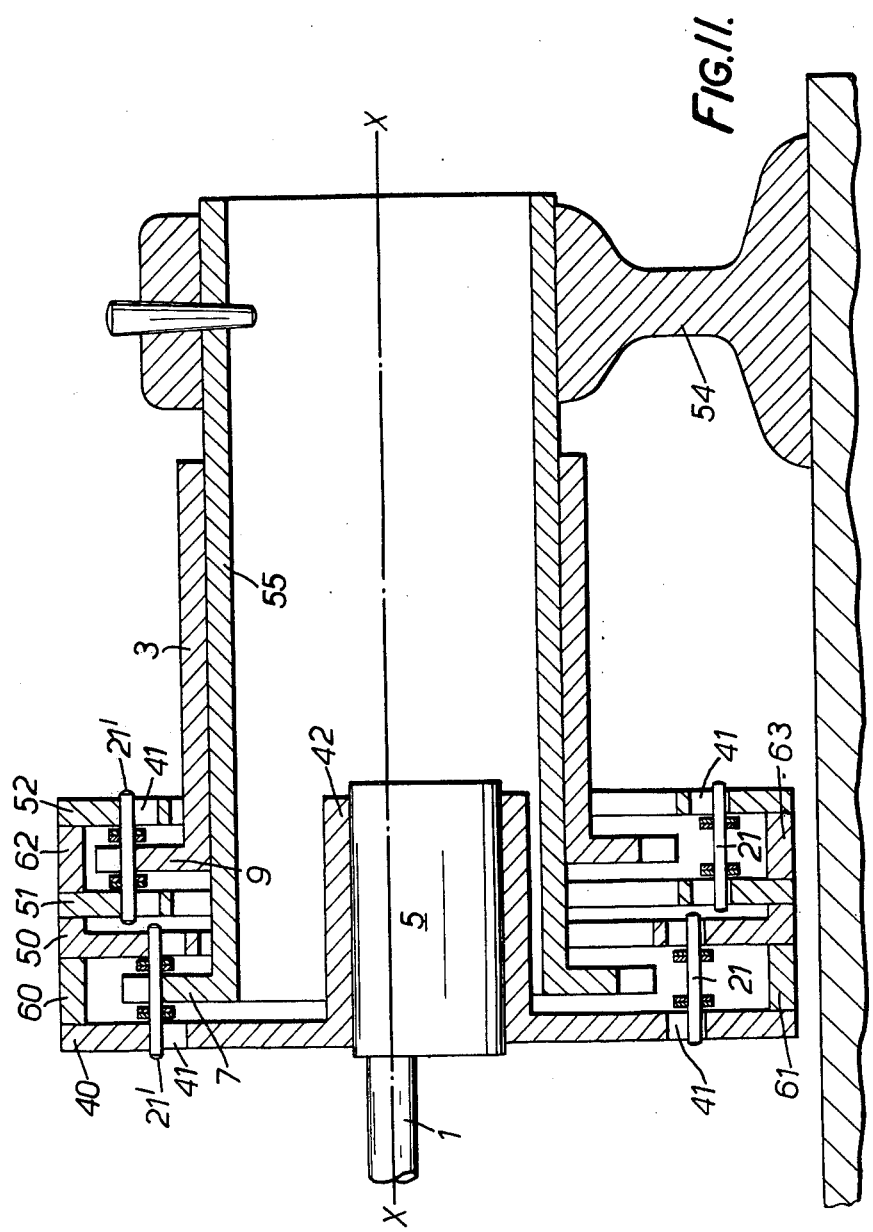
FIGS. 11, 12 and 13 are partly cross-sectional views of alternative, simple, embodiments of two stage speed changing devices according to the invention.

For example, a one stage device may be constructed in which the (rigid) gear is held stationary, (i.e. becomes the reaction element), while the entire assembly of hole-bearing plates 40 and 50 may be eccentrically gyrated and rotated by means of the eccentric 5. Such an arrangement constitutes the first stage of the device illustrated in FIG. 11 which actually is a two stage device in which the first gear 7 is stationary, being fixedly and coaxially secured on hollow shaft 55, which is in turn fixedly held in any convenient way, for example by means of a support 54. A second gear 9 is fixedly and coaxially supported on a hollow output shaft 3, which is also coaxially but rotatably supported about the shaft 55. The input shaft 1 rotates coaxially to gears 7, 9 and to the output shaft 3, X—X being the common axis. The first stage plates 40 and 50, and the second stage plates 51 and 52, are fixedly secured to one another and are also fixedly mounted on hollow shaft 42, which is in turn rotatably journalled about eccentric 5. The input shaft 1 is fixedly secured to the eccentric 5 which now eccentrically rotates the assembly of first stage and second stage plates, i.e., first stage plates 40 and 50 and second stage plates 51 and 52. Each of these sets of plates has the above described holes 41, controlling the movement of pins 21 of chain loops.

DESCRIPTION OF THE EMBODIMENT OF FIG. 12

Figure 12:
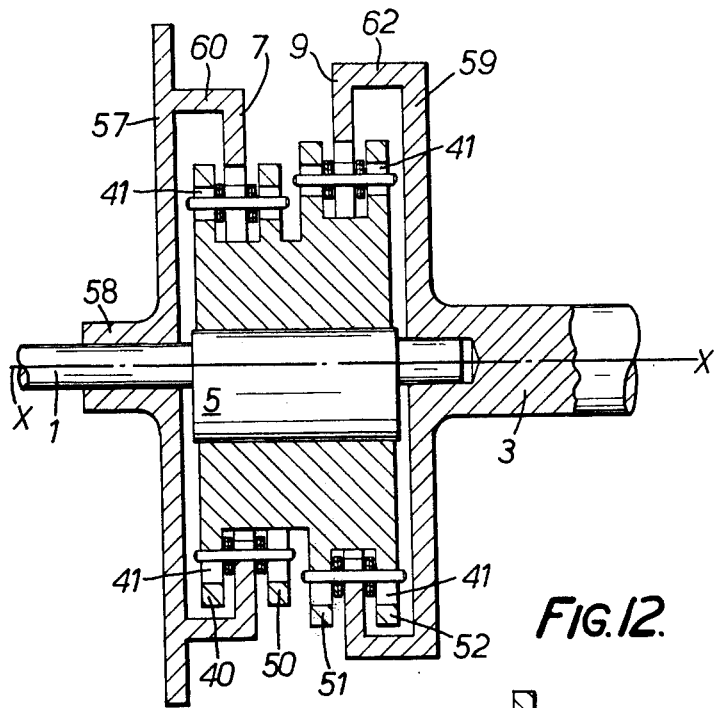

Until now, all gears or sprocket wheels, i.e., those designated by numerals 7 and 9, have been male (or external) gears. But female (or internal) gears or sprocket wheels and the like, may equally well be employed and such an embodiment is illustrated in FIG. 12, where the input shaft 1 is secured to the eccentric 5 and two sets of pin capturing plates, fixedly secured to one another, rotate and gyrate about the eccentric 5. The first set of plates 40 and 50 and the second set 51 and 52, are each formed with the previously described pin capturing holes 41, which guide and control the motion of chain pins, which in turn engage, in the previously described manner, the stationary first stage internal gear 7 and the rotating second stage internal gear 9, which is fixedly interconnected to the output shaft 3. The interconnection and support of the various parts and components of this device may be accomplished in any convenient or desired manner. For example, the first stage internal gear 7 may be fixedly supported on, or be an integral part of, stationary flange 57, by means of (optionally tubular) member 60. The flange member 57 may conveniently become the stationary support of the device. Of course, the member 57 may have any other desired shape besides that of a flange, and it may optionally be formed with a hub 58, within which the input shaft 1 may be conveniently journalled. Likewise, the rotating second stage internal gear 9 may be fixedly interconnected to, or be a part of, output shaft 3, through members 62 and 59.

DESCRIPTION OF THE EMBODIMENT OF FIG. 13

Figure 13:
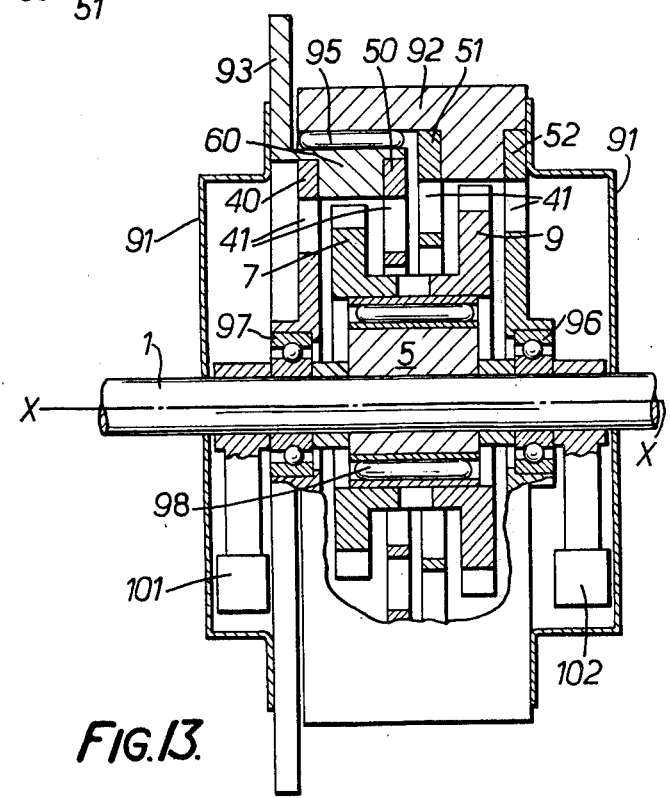

It is evident that the devices of the present invention are capable of an almost endless number of physical configurations and arrangements of components. Thus, another example is shown in FIG. 13 which illustrates a particularly useful embodiment of the invention, the basic arrangement of components being substantially similar to the embodiment illustrated in FIG. 8 and previously described in some detail, although it will be noted that the input shaft 1 now extends through two cover plates 91 and the output (fixedly secured to plates 51 and 52 which are formed with the holes 41) becomes the cylindrical envelope 92 surrounding the entire device. Stationary, first stage, plates 40 and 50 are held apart by a spacer ring 60 which is a part of the flange 93, which flange 93 may thus conveniently become the stationary support member of the device. Needle bearing 95 (whose inner race surrounds the stationary spacer ring 60) and ball bearing 96 (whose inner race surrounds the input shaft 1) bearingly support the output cylinder 92 in a very firm and convenient manner, while the input shaft 1 fixedly supporting the eccentric 5, may freely rotate within bearings 96 and 97. The sprocket wheels 7 and 9 are bearingly supported by a needle bearing 98 for rotation and gyration about the eccentric 5. The two chain loops, similar in all respects to the chain loops of FIG. 8, have been omitted to simplify the illustration. Counterweights 101 and 102 substantially counterbalance the eccentric 5 and the sprocket and chain assembly.

DESCRIPTION OF THE EMBODIMENT OF FIG. 15

It was previously stated that any of the basic components may be the input or the output. Likewise, the eccentrically gyrating assembly was built with similar components, for example, the eccentrically gyrating assembly in FIG. 8 was the first and second sprockets 7 and 9, while in FIG. 11 it was the pin-capturing plates 40 – 50 and 51 – 52.

But this is not mandatory and, in fact, unusual results are obtained when dissimilar components are employed in the two stages. One such unusual result, or at least unexpected, is that the overall reduction ratio of the device, instead of being further REDUCED, is actually INCREASED (i.e., the ratio becomes less than that of any of the two separate stages if separately considered).

Thus, taking as an example the embodiment described in connection with FIG. 8, the ratio there is 1 to 1680.

Now if dissimilar first and second stages according to the invention are employed, but having the same gear ratios as in the previous example, the unexpected final ratio of 1 to 20 has been calculated, which is, in fact, virtually one half the reduction of each of the two stages is separately considered!

This inverted arrangement according to the invention, has certain advantages in specific applications. Thus, because it is conveniently inefficient, if power is applied to its output shaft 3, the device will act as a brake, and (rotatry) motion will not be transmitted to what is normally its input shaft 1. This braking action is an advantage because it insures safety in applications such as cranes, hoists, lifts, elevators, etc., (i.e., should the power applied to their input shaft be cut-off, such cranes, hoists, lifts, elevators, etc., will not accidentally reverse and cause an accident.)

Figure 15:
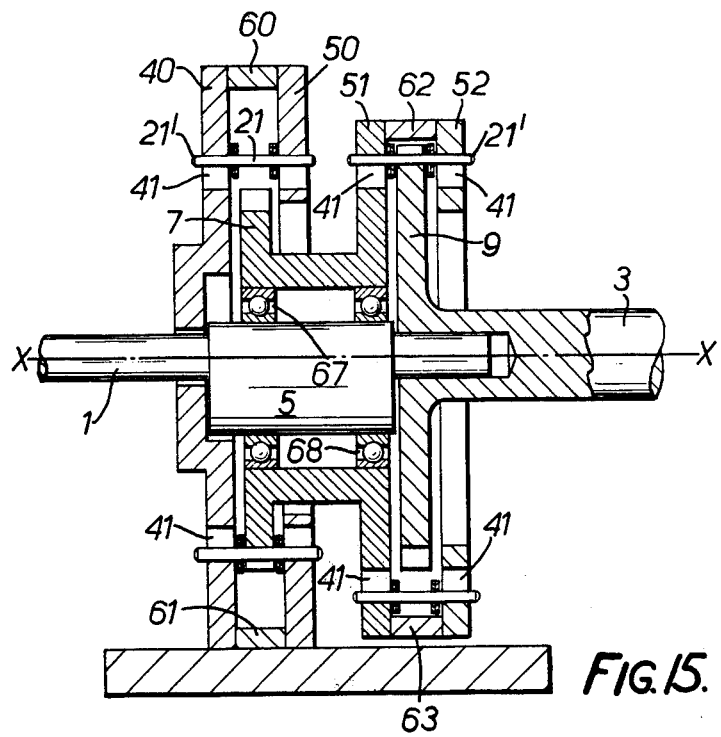
FIG. 15 is a partly cross-sectional view of still another embodiment of the invention.

FIG. 15 illustrates such an example of reversal of components. Thus, the first stage is essentially similar to that of FIG. 8, while the second stage is similar to that of FIG. 11. In fact, the eccentrically gyrating first stage is the sprocket wheel 7, while the eccentrically gyrating second stage is the pin-capturing plates 51 and 52, the sprocket wheel 7 and the plates 51 and 52 being fixedly secured to one another and eccentrically gyrating as one unit. Likewise, the first stationary stage member is the assembly of the pin-capturing plates 40 and 50, while the output is rotating gear 9, fixedly secured to output shaft 3. All other parts and components are similar to those previously described in connection with other embodiments and need no further elaboration.

DESCRIPTION OF THE EMBODIMENT OF FIG. 16

Figure 16:
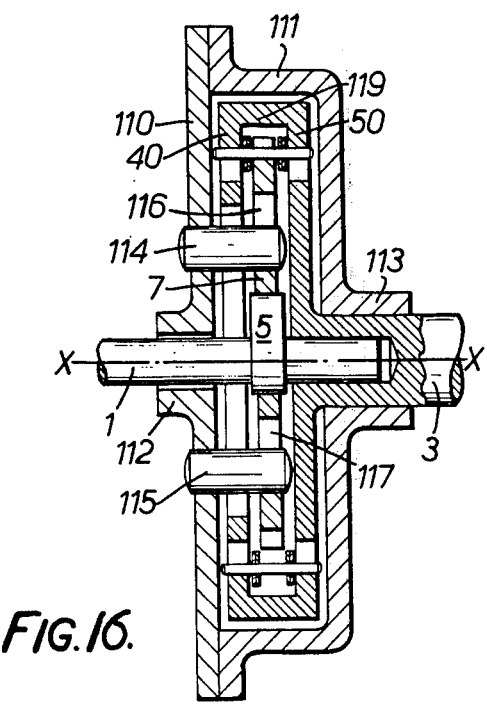
FIG. 16 is a partly cross-sectional view of still another, and particularly useful, embodiment of the invention, of the single-stage coaxial type.

The embodiment of FIG. 16 is a further example of how the concept and principles of the invention may be advantageously employed and/or adapted in all kinds of gearing devices. In fact, the embodiment of FIG. 16 makes possible the coaxial disposition of input and output shafts of a single stage speed-changing device, when such device includes components and parts arranged according to the concepts and principles of the invetion.

Numerals 110 and 111 designate the housing, for example, plate or flange 110 formed with hub 112 within which input shaft 1 is journalled. Input shaft 1 is also freely, independently and coaxially, rotating within the output shaft 3, as shown in the illustration. Output shaft 3 is, in turn, journalled within hub 113 which is an integral part of the pan 111. The pan 111 may be fixedly secured to flange 110 as shown, in any convenient way, so that members 110 and 111 conveniently constitute the housing, which also rotatably supports for independent coaxial rotation the input and output shafts.

The input shaft 1 is formed with, or fixedly supports, eccentric 5, about which is journalled the sprocket wheel 7, in the manner described in connection with the other embodiments. The two pin-capturing plates 40 and 50 are formed with the capturing holes 41, within which are contained for limited motion the previously described engaging means (for example the protruding ends 21' of the pins of a transmission chain according to the inventon). Plate 40 is actually of annular shape and is fixedly supported on plate 50 by any convenient means, for example by means of stand-offs or by means of tubular member 119. In turn, plate 50 is fixedly supported on output shaft 3 and rotates coaxially with it.

Equidistantly from the rotational axis X — X of the input and output shafts, and substantially parallel to it, are fixedly supported on flange member 110 two cylindrical pins 114 and 115, which freely pass through two circular holes 116 and 117 arranged on sprocket wheel 7, these holes 116 and 117 equidistantly located from the centre of eccentric 5 and having a diameter equal to, or slightly larger than, the sum of the diameter of one of these pins plus the eccentricity of the eccentric 5.

Thus, while the eccentric 5 rotates, the pins 114, 115 and the holes 116, 117 restrain the sprocket from rotating, but allow it a free wobbling motion which, in turn, allows the teeth of this sprocket 7 to progressively mesh with the meshing means of the invention, for example the pins or rollers of the loop of the special transmission chain of the invention. Since these meshing means are contained, for limited motion, within the capturing holes 41 which are, in turn, arranged on the coaxially rotating plates 40 and 50, these plates 40 and 50 and their coaxially and fixedly supported output shaft will rotate at the desired reduced speed.

Generally, all other parts and components of the embodiment of FIG. 16 are similar to those previously described in connection with other embodiments and need no further elaboration, but it must be made clear that the basic components of the invention may be otherwise arranged and disposed (as previously described) in order to achieve substantially the same results obtained with the above-described device of FIG. 16.

DESCRIPTION OF THE EMBODIMENT OF FIG. 17

The embodiment of FIG. 17 illustrates a particularly useful arrangement for the endless flexible loop, when this takes the form of a chain, and in particular, a roller chain.

In a conventional roller chain of either the simplex or multiplex configurations the outer side plates of the connecting links are always riveted to the chain pins thus keeping the whole sandwich of the chain together.

In order to be able to rivet to the pins, (which are always case hardened to alleviate wear) clearly the outer ends of the pins must be kept soft, otherwise the pins cannot be riveted to the side plates. Furthermore, at each outer end the pins have to be reduced in diameter in order for the plate to have a shoulder against which it can abut, to enable the riveting to be effective.

In view of the above, the pins are a special item and, to keep manufacturing costs down, the designer is limited to the use of standard roller chain pins which may not always suit his purpose.

In addition, where, in constructing devices according to this invention, the designer wishes to have a design configuration where the chain side plates are outboard from the datum plates provided with the capturing holes (movement limiting means), then the riveting of the chain side plates to the pins would have to take place whilst the whole device was being assembled, rather than manufacturing and assembling the chain separately. Clearly, having to assemble and rivet the chain at the same time as assembling the unit is highly undesirable.

To avoid all these problems, a novel arrangement will now be described in conjunction with FIG. 17. This novel arrangement eliminates all riveting of the pins and, therefore, the ends of the pins need not be soft and, furthermore, no shoulders are required. The chain side-plates are fully floating on the pin-ends and are a running fit on them . Thus, the designer may use standard hardened steel rod and cut it to whatever length is required.

The chain, which consists of a whole series of side plates and rollers on the pin in virtually any number of configurations to suit the designer's needs, is held together in the following way, as illustrated in FIG. 17 which shows a single stage speed-changing device. In this arrangement there is one datum plate 40 and two sprockets 7, 7' gyrating on each side of the datum plate, but with the two sprockets fixedly connected to each other in any suitable manner, such as by splines 120 and a grub screw 211. The chain consists of the following sandwich: Two side plates 171, 173 then three rollers 122, 123, 124 (one for each sprocket, and one for the datum plate) and then two more side plates 174, 172, all on a pin 21 which is just slightly longer than the total thickness of the sandwich.

In order to prevent the floating side plates from coming off the ends of the pin so that the whole chain would disintegrate, a steel circular disc 125, 125' is secured fixedly to and concentric with the outer side of each sprocket 7, 7'. The radius of the disc is as great as the outer point of the chain when it reaches its furthest point away from the center of the sprocket; in other words when a pair of rollers 122, 124 are passing over the top of a tooth of the sprockets 7, 7'.

The discs 125, 125' are located axially just far enough away from the sprocket teeth so as to provide enough space for the chain side plates to drop between the teeth and the disc and to be able to move freely in a radial direction.

Ideally, at the outer ends of each pin 21 and after the outer side plates 171, 172 have been put on, a dished washer 126, with the dome facing inward is located, in order to hold the whole chain assembly lightly in position.

By this method of assembling the chain, it will also be possible very easily to construct assemblies where the number of sprockets and datum plates is doubled in order to increase the capacity of the device, merely by making the chain pins of a suitable length. This provides the designer with almost total freedom to introduce an almost limitless series of combinations.

Obviously the outer discs are attached to whichever part of an assembly (either the sprocket or the capturing plate) is positioned to the outside of any particular arrangement.

It should be noted that in FIG. 17, the input shaft, eccentric and any bearings have been omitted for clarity, but the discs 125, 125' are provided with large openings 127 providing access therefor and to screw 211.

ALTERNATIVE EMBODIMENTS OF MOVEMENT-LIMITING MEANS

As repeatedly abovementioned, the "movementlimiting means" include "engaging means" which are captured for limited motion within "capturing means".

In the previously described embodiments and examples it was considered convenient to arrange the engaging means on the meshing means (for example, the protruding ends 21' as a prolongation of the meshing pins 21). In fact this is not the only possibility and either the capturing or the engaging means may be arranged on the meshing means and either the engaging or the capturing means on a plate such as the datum plates.

Therefore, it is equally well possible to secure the engaging means (for example, pins) on the plates and arrange the capturing means (for example, holes) on the meshing means or any convenient part thereof, for example on transmission chains or any other form of flexible transmission member employed according to the invention.

Figure 14A:
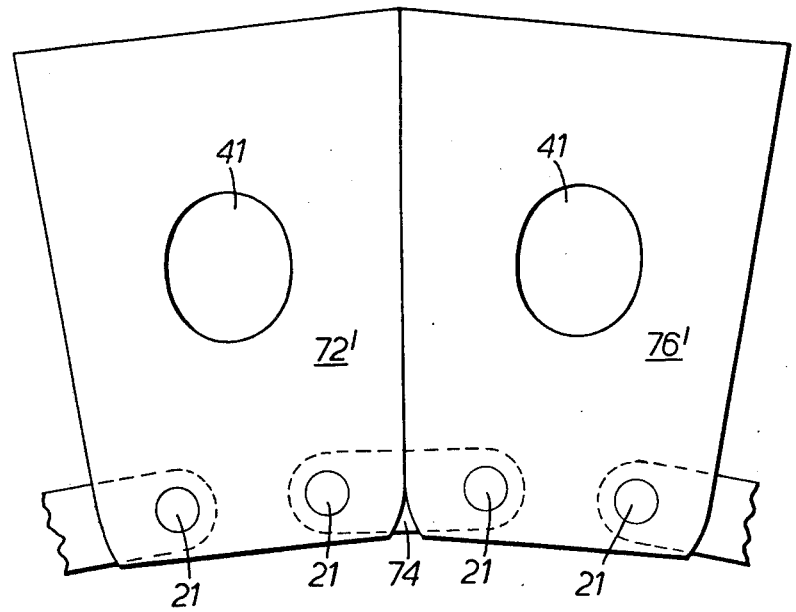
FIG. 14A is a view similar to that of FIG. 14, and illustrating the same parts, except that the two consecutive chain links are shown abutting against one another.
Figure 14:
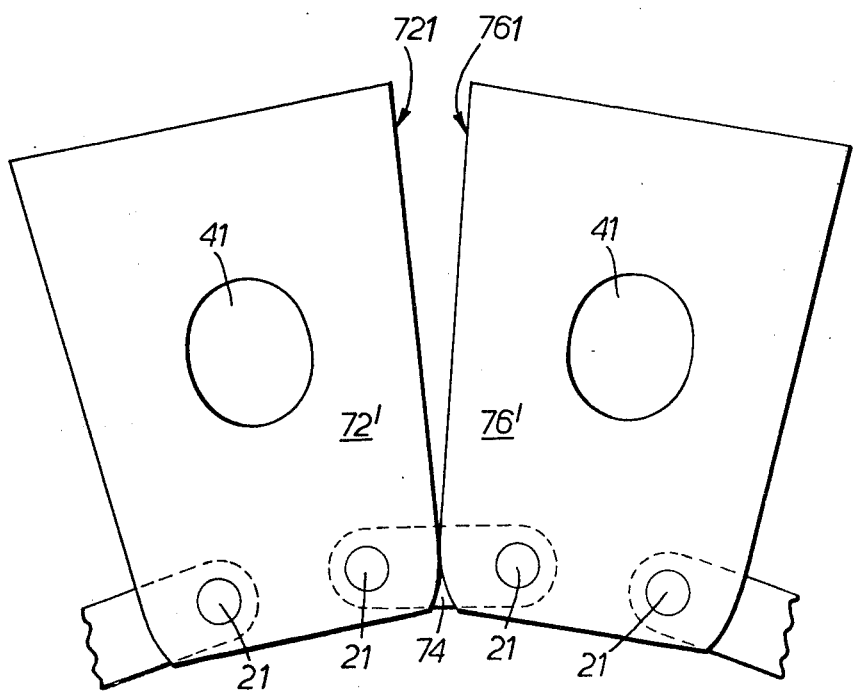
FIG. 14 is a side elevation of two consecutive special chain links which may be employed in embodiments of devices according to the invention.

To do so, it will probably be convenient to extend the size of the link-plates of the chain, in whatever manner is dictated by design considerations, for example, as shown in FIG. 14, extend the link-plates 72' and 76' to a approximately trapezoidal shape, in order to provide space for pin-capturing holes 41.

The approximately trapezoidal shape of these link plates (as shown in FIG. 14) has the further advantage that while it allows flexing between link-plates within desired limits, it keeps the chain loop in a more or less circular shape, i.e. it prevents the total collapse of the chain loop, and this characteristic may be quite desirable in specific applications.

Thus, while interconnecting and conventional link 74 allows flexing of the chain in one direction, two consecutive edges 721 and 761 will permit only limited flexing in the other direction, no further flexing being possible once two consecutive edge 721 and 761 abut against one another, as shown in FIG. 14A. It is evident that in order to achieve the desired control, the shape and dimensions of trapezoidal, special, (extended) links, such as links 72' and 76', must be carefully chosen.

In any event, in any of the embodiments according to the invention, the protruding pins 21' may be replaced by any other type, form, or shape, of engaging means to be captured by any type, form or shape, of capturing means (other than holes 41), in order to guide, and restrain individual meshing means (such as meshing elements, or segments of flexible loops), along desired paths of limited (wobbling) motion.

Figure 10:
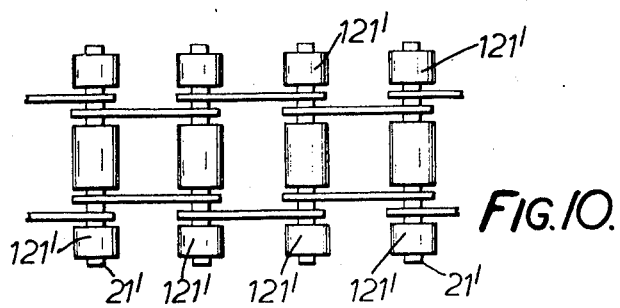
FIG. 10 is a front elevation of a section of a special roller chain, being a still further embodiment of a loop of the invention.

For example, roller means may be journalled over the protruding pins 21', such as the rollers 121' shown in FIG. 10, such arrangement advantageously reducing the friction between such engaging means and their corresponding capturing means, for example, their capturing holes 41.

In the previously described embodiments there was one pin and one hole per unit of meshing means (such as pins) but although this may be desirable in most cases, in the final analysis it is not essential. Thus, it is possible to have one engaging and one capturing means for every second chain link, or third chain link, or more generally, the number of engaging and capturing means does not have to correspond with the number of meshing means (or meshing elements, or elemental segments of a flexible loop).

Equally well the physical location of such engaging and capturing means along, or on, the "flexible loop" and/or on any support (such as plates 40) may be wherever it is desired, convenient, or dictated, by design consideration.

Finally, if a segment only of a gear (or sprocket wheel) is employed in a device, for example a device for imparting a rocking or reciprocating motion, a full circle of a "flexible loop" will not be required, and a segment only of such loop will suffice.

As repeatedly stated, all kinds of speed changing arrangements and gear configurations may be adapted or modified in accordance with the present invention.

Generally, the constructions falling within the scope of this invention are applicable in all sorts and types of gear trains, torque converters, speed changing mechanisms and the like, where not only gears, but any type and configuration of torque transmitting elements are employed. Thus, generally, wherever a multitooth, or a large-segment, engagement is desired, conventional gears, pulleys, wheels, belts and the like, may advantageously be replaced, in many instances, by meshing means and movement-limiting means in accordance with the invention.

DISTINCTIVE FEATURES OF FLEXIBLE LOOPS ACCORDING TO THE INVENTION

Flexible transmission loops, such as transmission chains, and the like, according to the invention, when used in combination with the movement limiting means in devices of the present invention, have unique advantages over the prior art and peculiar properties not commonly associated with such flexible loops and chains. A number of these advantages and properties have been described above, or are obvious, but others are far from being obvious. Therefore, some of these advantages will now be described with reference to chains and chain loops, because chains are a popular and preferred medium in countless applications but, it must always be kept in mind that, other types of transmission loops (such as belts toothed belts, etc.) have similar or equivalent properties.

Flexing of chains:

In all design considerations involving transmission chains, it must be always kept in mind that a chain, when wrapped around a sprocket wheel, assumes the geometry of a polygon and not a circle. The polygon has sides defined by lines drawn between successive pin-centres.

Therefore, in conventional applications according to prior art, when a chain transmits power between two sprocket wheels, each of its links travels in substantially linear direction (between the two sprocket wheels) and then, it abruptly swings radially to become the side of a polygon. This "swing angle" is equal to the external angle of the polygon and, therefore, such swing angle becomes larger as the number of sprocket teeth decreases.

In applications according to the present invention, since the chain is wrapped around only one sprocket, it always remains in a substantially circular configuration and, therefore, the "swing angle" is reduced to an extremely small value. Even so, the chain links carry no load while they swing through this "swing angle". It is therefore evident that chains perform under greatly advantageous conditions when employed in devices according to the present invention and, in fact, wear on the chain pins and bushings, galling effects and, generally, wear of chains and sprocket wheels is greatly reduced.

Chain Velocity:

In conventional applications according to prior art, for a given, constant, angular velocity and pitch, the linear velocity of the chain increases as the diameter of the sprocket wheel increases.

Not so in applications according to the present invention where, for a given constant angular velocity and pitch, but regardless of the diameter of the sprocket wheel, the linear velocity of the chain pins or rollers remains substantially the same! The reason is that the engaging means (for example the protruding ends 21') always travel substantially the same distance within the capturing means (for example holes) regardless of the diameter of the wheel.

Kinetic Energy:

In conventional applications according to prior art, due to the above explained polygon configuration, when a chain-link abruptly swings (through the swing angle) into engagement, its leading pin or roller hits the recess between two sprocket teeth with a considerable force and velocity (the velocity actually depending on the speed of travel of the chain between the two conventional sprocket wheels and the swing angle). The resulting "force of impact" may be, in most applications, the largest single force the chain must withstand.

In applications according to the present invention, because the linear velocity of chain elements remains the same regardless of the pitch diameter, because the "swing angle" is extremely small or negligible, and since the kinetic energy is a function of the square of the velocity, the abovereferred "force of impact" is reduced to a negligible value.

Load-sharing by Chain Links:

In conventional chain drive applications according to prior art, for example in a bicycle chain, the link just swinging into engagement immediately assumes approximately 50% of the load, while each link ahead carries progressively approximately half of the remaining load, so that only the first few links carry any appreciable (and diminishing) load.

But in applications according to the invention, the chain is slack prior to engagement and upon engagement each link progressively assumes its share of the total load.

Transmission of Load "in Series" vs "in Parallel":

In conventional chain applications according to prior art, the load is transmitted along the stretched length of the chain, thus the links are "in series", and the chain is only as strong as its weakest link.

But in applications according to the present invention the engaging and meshing elements are "in parallel", share the load, and the strength of the chain is substantially the sum of the strength of the elements that are under load.

Tension Along Chain:

In conventional chain applications, a portion of the chain's length, that is that length which lies between the driving and the driven sprocket wheels, is under tension.

But in applications according to the present invention, there is substantially no taut side, or portion, of chain.

Chordal Rise and Fall:

In conventional applications, due to the polygon configuration of the two sprocket wheels, when a chain link swings into engagement, the deleterious, and possibly destructive, phenomenon of "chordal rise and fall" occurs, sending pulsations to the portion of the chain which is under tension.

But in applications according to the present invention, since substantially no part of the chain is under tension, and since there is a minimal "swing angle", such chordal rise and fall cannot occur.

Torque Handling Capacity:

In conventional gear trains, all other parameters being kept equal, doubling the gear diameter simply doubles the torque. Of course this is so because regardless of the diameter (or number of teeth), substantially only one tooth at a time meshes. However, in devices according to the present invention, doubling the diameter of a sprocket wheel (maintaining the pitch and all other parameters equal), approximately quadruples the torque handling capacity. This is so because not only the distance from the centre of rotation doubles, but also because the number of engaging chain links doubles.

Chain Lubrication:

In conventional chain applications, lubricating is difficult and becomes increasingly more so as the speed of the chain increases, since lubricants tend to fly off due to centrifugal forces. In devices according to the present invention, however, the chain effectively only moves at low speeds and the centrifugal forces being small, lubrication becomes easier. In extremely difficult cases, and where the size of the chain links permit it, it is always possible to have tubular chain pins (with appropriate smaller holes in desired locations) in order to pressure-lubricate the chain by feeding lubricant to these tubular chain pins through flexible tubing connected to a central reservoir of lubricant. This very convenient lubrication method becomes possible because the chain effectively gyrates only, or in the second stage, and equivalent applications, the chain also rotates, but at usually very low speeds.

Thus, FIG. 18 illustrates, in a somewhat diagrammatic way, a simple embodiment of such lubricating method. Hollow pin 21 (shown enlarged to illustrate its features) has appropriate small holes in desired locations. A flexible tubing 202 is connected to one of the pin's ends, the other end of this flexible tubing being connected to a reservoir of lubricant 203. Such hollow pin 21 may be any of the pins 21 (i.e. the meshing means and/or the engaging means of the invention), previously described and illustrated in the figures. The abovementioned small holes may be, for example, holes 201 shown in the illustration. It is now evident that lubricant may be fed (by means of pressure or gravity) from the reservoir 203, through the flexible tubing 202, and will emerge through the small holes 201, thus supplying lubrication where required. Although only one pin 21 is shown in FIG. 18, it is evident that the same reservoir may, if so desired, supply lubricant to any number of pins 21 and/or any other location of the device or mechanism.

GENERAL REMARKS, COMMENTS & DEFINITIONS

The following Remarks, Comments and Definitions of Terms, are essential for the complete and precise understanding of the invention and the concepts taught by it.

Wheel Means and Gear Means:

The term "Gear Means" will generally include "Wheel Means", and such Gear Means and Wheel Means may have any shape, size or configuration, including an Annular or Cylindrical shape, and, it will always be understood that, as, when and where required, they will be formed with "portions complementary to the meshing means".

Portions Complementary to the Meshing Means:

This term will include any desired or convenient means or arrangements which will "Drivingly Interconnect" the Meshing Means with the Gear Means or Wheel Means. For example, such complementary portions are the teeth, or the teeth means, of sprocket wheels and gears described and illustrated in connection with several embodiments of the invention.

Wobbling Motion:

Generally, the Individually Movable Meshing Elements of the invention will be moving in-and-out of contact with the Wheel Means, such motion being of any desired type (organised or not), which motion we generally define as a "Wobbling Motion". When subjected to such a motion, an axis of a wobbling element, part, or member, may be sequentially displaced linearly (along the axis) or parallelly to itself, or in any combination thereof or, generally, in any desired manner.

Datum Plate and Datum Member:

The term "Datum Plate" will include the general term of "Datum Member". In fact, such Datum Member may have any desired shape, or configuration, for example, an Annular Shape, a Cylindrical Shape, or any shape dictated by design considerations.

The Movement-Limiting Means (or parts thereof), although functionally separate, may physically form an integral part with the Gear Means and/or the Datum Member and/or the Meshing Means.

Likewise, in some applications, the Wheel Means and the Datum Member may become physically integral parts.

Likewise, in some applications, the Complementary Portions of the Wheel Means and parts of the Movement-Limiting Means may be physically integral.

The Capturing Means do not have to be apertures, or holes, in the usual sinse of the word, but may equally well be notches, cut-outs, or may be any other convenient member, element, or means and, generally, will have any convenient or desirable shape, form, or configuration.

Generally, it will now become evident that, the "Quadrant-wave Drive" principle of the invention (see previous chapter "Detail Analysis") and modifications thereof, may be reduced to practice in any number of ways.

It will be understood that the Definitions, Comments, Remarks, Principles, etc., contained in the chapter "Summary and Basic Principles of the Invention" (as well as throughout the text of this disclosure), must be added to, and are an integral part of, the present chapter.

Generally, in all the embodiments of the invention disclosed herein, as well as in all the devices disclosed herein, it will be understood that the shape, size, configuration, etc., of any of the various parts, elements, components and assemblies, as well as arrangements for supporting them, mounting them, connecting them, etc., it is not intended to exclude any modification, change, alternative arrangements, etc., which fall within the scope of the present invention.

We claim:

1. A motion transmitting device including:
   a. eccentric means,
   b. meshing means in the form of a series of linked but individually and independently movable meshing elements,
   c. wheel means formed with portions complementary to said meshing elements, and
   d. a series of individual movement-limiting means, wherein said eccentric means is disposed to cause said meshing elements sequentially and independently to wobble in and out of meshing engagement with successive said complementary portions, each of said individual movement-limiting means guiding in captive dependency always the same individual meshing element within specific limits of wobbling motion, said wobbling motion being in two degrees of freedom relative to each of said individual movement-limiting means.

2. A device according to claim 1, wherein said meshing elements are flexibly interlinked with one another.

3. A device according to claim 2, wherein hinge means provide said flexible interlinking.

4. A device according to claim 1, wherein said meshing elements are flexibly interlinked to form a flexible member.

5. A device according to claim 4, wherein said flexible member is in the form of a transmission chain.

6. A device according to claim 4, wherein said flexible member is in the form of at least one continuous belt with said meshing elements projecting therefrom.

7. A device according to claim 4, wherein said flexible member is endless.

8. A device according to claim 1, wherein said meshing elements are pins.

9. A device according to claim 8, wherein teeth are carried by said wheel means to mesh with said pins.

10. A device according to claim 8, wherein rollers are carried on said pins.

11. A device according to claim 1, wherein said meshing elements are teeth and said wheel means is formed to define complementary recesses to received said teeth.

12. A device according to claim 1, wherein said movement-limiting means includes engaging means and capturing means which capture and guide said engaging means within predetermined limits.

13. A device according to claim 12, including a datum member and wherein one of said engaging means and capturing means is arranged on said meshing means and the other on said datum member.

14. A device according to claim 1, including a datum member and wherein said movement-limiting means includes engaging means and capturing means, one of which is provided on said meshing means and the other on said datum member, said engaging means comprising engaging pins and said capturing means comprising apertures which receive and guide said engaging pins for movement within predetermined limits.

15. A device according to claim 14, wherein said engaging pins carry rollers.

16. A device according to claim 14 wherein said engaging pins are carried by said meshing means.

17. A device according to claim 14, wherein pins provide said meshing elements and said engaging pins are integral with said pins and chain plates are carried by and link said integral pins.

18. A device according to claim 1, wherein said movement-limiting means includes engaging means and capturing means, pins provide said meshing elements, said engaging means comprise engaging pins which are integral with said pins, chain plates are carried by and link said integral pins, and said capturing means comprises a datum plate defining apertures which receive and guide said engaging pins for movement within predetermined limits and wherein said integral pins have ends which carry said chain plates and which project beyond whichever of said datum plate and gear means is positioned to the outside.

19. A device according to claim 18, wherein said pin ends form a respective set to each side of the device and a disc member is positioned in close proximity to each set of projecting pin ends so as to confine longitudinal movement of said integral pins.

20. A device according to claim 18, wherein said pin ends form a respective set to each side of the device and a disc member is positioned in close proximity to each set of projecting pin ends so as to confine longitudinal movement of said integral pins and a dished washer is interposed, on each projecting pin end, between said chain plates and said disc member.

21. A device according to claim 18, wherein said pin ends form a respectie set to each side of the device and a disc member is positioned in close proximity to each set of projecting pin ends so as to confine longitudinal movement of said integral pins, each disc member being integral with whichever of said datum plate and gear means is positioned to the outside.

22. A device according to claim 14, wherein said engaging pins are carried by said datum member, and individual segmental plates, each of which define one of said apertures, are carried by said meshing elements of said meshing means.

23. A device according to claim 1, including a lubricant supply and flexible tubing which connects at least some of said meshing elements to said lubricant supply.

24. A device according to claim 1, wherein one of said wheel means and said meshing means eccentrically surrounds the other.

25. A device according to claim 1, wherein the number of said meshing elements is different from the number of said complementary portions on said wheel means.

26. A device according to claim 25, wherein the number of said meshing elements is at least one different from the number of said complementary portions.

27. A motion transmitting device according to claim 1, wherein one of four integers being said eccentric means, meshing means, wheel means and movement-limiting means provides a rotational input, and one of the other integers provides a rotational output.

28. A device according to claim 27, wherein one of the other integers is caused by said eccentric means to wobble eccentrically, whilst axial rotation preventing means prevents that integer from rotating axially.

29. A device according to claim 28, including axial rotation preventing means and a stator member, and wherein one of the other integers is caused by said eccentric means to wobble eccentrically and that integer and the stator member are parts which carry between them the axial rotation preventing means which is in the form of a hole defined in one part and a pin which is fixed at one end to the other part and positioned at its other end within said hole which is large enough to allow eccentric rotation of that integer.

30. A two stage motion transmitting unit constructed from two motion transmitting device each including:
eccentric means,
meshing means in the form of a series of linked but individually and independently movable meshing elements,
wheel means formed with portions complementary to said meshing elements, and
a series of individual movement-limiting means, wherein said eccentric means is disposed to cause said meshing elements individually and sequentially to wobble in and out of meshing engagement with successive said complementary portions, each of said individual movement-limiting means guiding in captive dependency always the same individual meshing element within specific limits of wobbling motion, said wobbling motion being in two degrees of freedom relative to each of said individual movement-limiting means, each of said devices having an input and an output, and wherein the output of one device is drivingly interconnected with the input of the other device.

31. A motion transmitting device including:
wheel means,
meshing means, and
a series of individual movement-limiting means, wherein said meshing means is a series of linked but individually movable elements each caused to wobble in and out of contact with successive complementary to said meshing means portions formed at the circumference of said wheel means, while each of said elements is individually guided by the same individual movement-limiting means to have a substantially ovoidal motion relative to said same individual movement-limiting means.

32. A motion transmitting device including:
a. eccentric means,
b. meshing means in the form of a series of linked but individually and independently movable meshing elements,
c. gear means formed with teeth defining a first pitch-circle about a first axis,
d. a reaction element having a series of movement-limiting means all equidistantly arranged about a second axis, each of said movement-limiting means having a design center, all said design centers lying on a second pitch-circle; wherein each of said meshing elements is in captive dependency to one of said movement-limiting means but is free to have a wobbling motion in two degrees of freedom with reference to said one movement-limiting means; said first and second axes being parallel to one another and at a distance apart defining the eccentricity of said eccentric means, said eccentric means disposed to cause
said gear means and movement-limiting means to rotate eccentrically with respect to one another, while at least one of said meshing elements drivingly interconnects one after the other of said teeth and one of said limiting means; said first and second pitch-circles intersecting one another.

33. A motion transmitting device including:
a. A toothed disc rotatably jounalled upon eccentric means on a rotating driving shaft;
b. A reaction member having a series of substantially ovoidal apertures all equidistantly arranged about said driving shaft;
c. A series of linked but individually movable meshing elements; wherein each such meshing element is in loose captive dependency to one of said apertures, but free to have a wobbling motion in two degrees of freedom with reference to said one aperture, whereby rotation of said eccentric means causes said meshing elements individually and sequentially to wobble, thereby drivingly interengaging tooth after tooth of said disc, thus transmitting an eccentrically rotating motion to said disc.

34. A motion transmitting device including:
a. eccentric means;
b. meshing means in the form of a series of linked but individually and independently movable meshing elements, said elements having pin means and each of said pin means having a geometric center;
c. gear means formed with teeth means;
d. a reaction member having a series of apertures each of said apertures having a design center and all said design centers lying on a circle; wherein each said pin means is in captive dependency to one of said apertures but free to have a wobbling motion in two degrees of freedom with reference to said one aperture; said eccentric means disposed to cause said gear means and reaction member to rotate eccentrically with respect to one another, while at least one of said meshing elements drivingly interconnects one after the other of said teeth means with one of said apertures; at any given moment the geometric centers of substantially half of said pin means lie on a semicircle, said circle and said semicircle intersecting one another at two points.

35. A motion transmitting device including:
a. eccentric means;
b. meshing means in the form of a series of linked but individually and independently movable meshing elements, said elements having aperture means and each of said aperture means having a design center;
c. gear means formed with teeth means;
d. a reaction member having a series of pin means each of said pin means having a geometric center and all said geometric centers lying on a circle;
wherein each of said aperture means contains in captive dependency one of said pin means but is free to have a wobbling motion in two degrees of freedom with reference to said one pin means; said eccentric means disposed to cause said gear means and reaction member to rotate eccentrically with respect to one another, while at least one of said meshing elements drivingly interconnects one after the other of said teeth means with one of said pin means; at any given moment the design centers of substantially half of said aperture means lying on a semicircle, said circle and said semicircle intersecting one another at two points.

36. A motion transmitting device including:
a. eccentric means,
b. meshing means in the form of a series of linked but individually and independently movable meshing elements,
c. wheel means formed with portions complementary to said meshing elements, and
d. a series of individual movement-limiting means, wherein said eccentric means is disposed to cause said meshing elements sequentially and independently to move in and out of meshing engagement with successive said complementary portions, while each of said individual movement-limiting means loosely contains in captive dependency always the same individual meshing element but also guids it to have a substantially ovoidal motion relative to said individual movement-limiting means to which it is in said dependency.

* * * * *

UNITED STATES PATENT OFFICE
CERTIFICATE OF CORRECTION

Patent No. 4,023,440    Dated May 17, 1977

Inventor(s) Kennington et al.

It is certified that error appears in the above-identified patent and that said Letters Patent are hereby corrected as shown below:

On first page, first column, correct the addresses as follows:
Item(75), line 2, after "Jersey" delete "Guernsey"
Item(73), line 2, after "Jersey" delete "Guernsey"

Col. 1, line 48, change "suchf" to --such--
Col. 1, line 64, change "protions" to --portions--
Col. 3, line 43, change "pinengaging" to --pin-engaging--
Col. 6, line 18, change "specail" to --special--
Col. 7, line 61, change "contreline" to --centreline--
Col.14, line 12, change "a" to --an--
Col.14, line 25, change "edge" to --edges--

Col.20, line 9 , (claim 21), change "respectie" to --respective--
Col.20, line 42, (claim 29), change "28" to --27--
Col.20, line 53, (claim 30), change "device" to --devices--

Signed and Sealed this

First Day of August 1978

[SEAL]

Attest:

RUTH C. MASON
Attesting Officer

DONALD W. BANNER
Commissioner of Patents and Trademarks